(12) United States Patent
Poston et al.

(10) Patent No.: US 9,482,429 B2
(45) Date of Patent: Nov. 1, 2016

(54) FIELD-READY OVEN

(75) Inventors: Jeffrey K. Poston, Independence, KY (US); Michael A. Swank, Dayton, OH (US); Robert G. Hockaday, Los Alamos, NM (US); Lawrence D. Weber, Holbrook, NY (US); Giampaolo Vacca, Loveland, OH (US)

(73) Assignee: GHT GLOBAL HEATING TECHNOLOGIES AG, Baar (CH)

( * ) Notice: Subject to any disclaimer, the term of this patent is extended or adjusted under 35 U.S.C. 154(b) by 535 days.

(21) Appl. No.: 13/045,311

(22) Filed: Mar. 10, 2011

(65) Prior Publication Data

US 2012/0231138 A1 Sep. 13, 2012

(51) Int. Cl.
*A47J 36/28* (2006.01)
*F23D 3/08* (2006.01)
*F23D 3/22* (2006.01)
*F24C 5/20* (2006.01)

(52) U.S. Cl.
CPC . *F23D 3/08* (2013.01); *F23D 3/22* (2013.01); *F24C 5/20* (2013.01); *F23D 2900/00001* (2013.01); *F23D 2900/03081* (2013.01)

(58) Field of Classification Search
CPC ....................................................... F24C 5/20
USPC ......... 126/93, 261–266, 275, 274 R, 263.01; 426/520
See application file for complete search history.

(56) References Cited

U.S. PATENT DOCUMENTS

| | | | | |
|---|---|---|---|---|
| 3,361,126 A | * | 1/1968 | Bloomfield | 126/261 |
| 3,509,870 A | * | 5/1970 | Sheppard | A45C 11/20 126/265 |
| 4,024,377 A | * | 5/1977 | Henke | 219/439 |
| 4,038,968 A | * | 8/1977 | Rovell | 126/261 |
| 4,049,949 A | * | 9/1977 | Fitzsimons | 219/521 |
| 4,062,806 A | * | 12/1977 | Roberts | 502/172 |
| 4,102,256 A | * | 7/1978 | John et al. | 99/372 |
| 4,384,513 A | * | 5/1983 | Pierick | 99/400 |
| 4,516,718 A | * | 5/1985 | Forbes, Jr. | B65D 5/68 229/146 |
| 4,559,921 A | * | 12/1985 | Benmussa | 126/263.09 |
| 4,762,113 A | * | 8/1988 | Hamasaki | 126/263.09 |
| 5,220,909 A | * | 6/1993 | Pickard et al. | 126/263.08 |
| 5,295,475 A | * | 3/1994 | Kaneko | 126/263.01 |
| 5,325,841 A | * | 7/1994 | Hooper, Sr. | A47J 37/0704 126/25 R |
| 5,517,981 A | * | 5/1996 | Taub et al. | 126/263.01 |
| 5,611,329 A | * | 3/1997 | Lamensdorf | 126/263.07 |
| 5,947,109 A | * | 9/1999 | Kobayasi et al. | 126/261 |
| 6,248,257 B1 | * | 6/2001 | Bell et al. | 252/70 |
| 6,539,935 B2 | * | 4/2003 | Ichikawa et al. | 126/263.09 |
| 6,674,048 B2 | * | 1/2004 | McConnell et al. | 219/385 |
| 6,698,334 B2 | * | 3/2004 | Brown | A47J 27/10 220/827 |
| 7,002,108 B1 | * | 2/2006 | Chang | 219/436 |
| 8,338,756 B2 | * | 12/2012 | Shei et al. | 219/402 |
| 2002/0119229 A1 | * | 8/2002 | Zimmerman et al. | 426/520 |
| 2004/0209206 A1 | * | 10/2004 | Hockaday et al. | 431/2 |
| 2010/0059039 A1 | * | 3/2010 | Cudnohoske | 126/263.01 |
| 2010/0140252 A1 | * | 6/2010 | Shei et al. | 219/482 |
| 2010/0227286 A1 | * | 9/2010 | Hockaday et al. | 431/170 |
| 2011/0073096 A1 | * | 3/2011 | Cudnohoske | F24J 1/00 126/93 |

* cited by examiner

*Primary Examiner* — Gregory Huson
*Assistant Examiner* — Aaron Heyamoto
(74) *Attorney, Agent, or Firm* — Jenei LLC (57) ABSTRACT

A field-ready oven has reinforced telescoped side walls that extend and hold a base, shelf, tray support and cover spaced apart. A low air intake and a semipermeable membrane deliver air and vapor fuel to catalyst pads on the shelf. Radiant heat from exothermic reaction is diffused over a bottom of a tray. Hot gas circulates around the diffuser and tray with a chimney effect before exhausting. A lid on the cover lifts for access to the tray. A fuel container in the oven forces fuel through a capillary restriction to limit fuel flow. A spring in the container is released to start fuel flow.

19 Claims, 7 Drawing Sheets

FIELD-READY OVEN

SUMMARY OF THE INVENTION

One embodiment is a portable, disposable oven consisting of food in a tray supported above one or more flameless catalytic burner(s). Fuel vapor and oxygen from air flow produce a flameless exothermic chemical reaction at a catalyst. Radiant heat may be diffused to uniformity for the food tray by a heat diffuser. Hot exhaust gases pass between the burner and the food tray, around the sides of the food tray, up and over the top of the food tray and out through one or more exhaust vent(s).

One embodiment of the device has the following elements. Food tray containing food to be heated, a heat diffuser, food tray support, catalytic heating assembly, fuel container, fuel motivator (to move the fuel to the heater assembly) the fueling transfer system (pipes hoses, etc.), initiation system (may consist of one or more items such as a valve to allow the fuel to begin, a means of initiating the fuel motivator, exposing the catalyst to oxygen, etc.), and the container which performs many functions in addition to storing and transporting the device.

The food tray can be made of any number of materials. Some are made of aluminum, while others are made of plastic. Each material has its own advantages and disadvantages. In one embodiment the food is sealed into the food tray for storage and heating.

When using a catalytic heating device it is necessary to provide an air gap between the catalytic heater assembly and the food tray to allow oxygen rich air to reach the combustion area. Therefore some means of supporting the food tray above the catalytic heater assembly is required. This can be as simple as providing one or more ledges on which a lip on the food tray can rest. Another embodiment involves a course wire metal mesh formed in such a way as to support the food tray.

When a support frame is used to support the food tray, it can additionally be used for several other purposes. It can have portions which protrude downward to additionally support and ensure a given gap between the food tray and the heater assembly(s) and other components. It can also be used to hold the heat diffuser in place. Additionally the support frame could be a heat diffuser in and of itself which could either totally eliminate the need for a separate heat diffuser or allow the heat diffuser to be smaller or in some other way modified in design which may be desirable.

The food tray could be a proprietary design or, more likely, an existing design. Food and plastic are all subject to scorching, burning, and or melting when exposed to excessive heat. In order to ensure that the heat is not too concentrated over the catalytic heater assembly one embodiment includes a heat diffuser. One material which is good for this component is aluminum, especially if painted, anodized, or in some other way darkened. It works as a radiant heat barrier to reduce the direct radiant heat transfer as well as conducts heat well throughout the aluminum body to spread the heat out over a larger surface area allowing more heat energy to be transferred into the food tray at lower temperatures reducing overheating is isolated areas. The dark color aids in its ability to absorb radiant heat.

Additionally the heat diffuser can have an amount of water or other heat absorbing material held on it. If the material is a phase change material, such as water which will change phase from a liquid to a gas, or a paraffin which will change from a solid to a liquid at these temperatures, it will assist in reducing hot spots and spreading heat more evenly. Each of these materials is inserted between the heat diffuser and the food tray or between the heat diffuser and the heat source. This added material could also be infused with a scent so that the heating process would release a pleasant smell. The use of a binder or pouch to hold the material in place if it is or may be in liquid from before use may be needed. One such embodiment includes the use of a product called dry water which is a relatively dry powder which contains water within it, which is released upon heating. We may want to allow the heating process to release the water or we may want to release the water before, at the same time as, or after, the start of the unit.

The catalytic heater assembly is comprised of one or more catalysts above a semipermeable or porous membrane above a cavity with one or more openings in which fuel enters. In this way the liquid fuel enters the cavity. The only path for the fuel to exit the assembly is through the catalyst. However, mostly fuel vapor can pass through the membrane. The fuel vapor is conducive to combustion. Once the heater is started some of the heat from the combustion will heat the bottom of the cavity. Once the boiling point of the fuel is reached incoming fuel will be vaporized and only vapor fuel should exit through the membrane and the catalyst. The fuel vapor then meets the air at the surface of the catalyst which encourages an exothermic chemical reaction between the fuel and the oxygen in the air, a flameless catalytic combustion. The heat from this reaction transfers to the food via radiant, convective and conductive means.

The fuel can be any number of fuels which combust on a catalyst. These can include, but are not limited to, methyl alcohol, ethyl alcohol, hydrogen, etc.

The fuel container design is specific to the fuel being used. When alcohol is used as the fuel a fuel container made of polypropylene or polyethylene is preferable to many other materials. This container can have a mechanism to pressurize the fuel as an integral part of its design. As one example the fuel container can have a plunger within it which can move inward reducing the internal volume of the container by any number of means including one or more springs. In this way the liquid fuel is pressurized, and then motivated to leave the fuel container through the fuel transfer system to the catalytic heater assembly.

As discussed in the fuel container section the fuel motivator 112 can be one or more springs or other elastic devices inside or outside the fuel container. However, the fuel motivator 112 can also be any number of pump types either integrated into or around the fuel container or separate of the fuel container all together.

The fuel transfer system includes hoses, pipes and capillary tubes which are used to conduct the fuel from the fuel container to the catalytic heater assembly. In order to maintain a steady flow of fuel one or more orifice or capillary tubes may be placed within the fuel transfer system. With a given fuel pressure the flow rate through a given orifice or capillary tube can be quite consistent and used to limit the power output of the catalytic heater assembly.

From the time of manufacture to the time of use the fuel must be kept separate from the catalytic heating assembly. At the time of use some means of triggering the flameless catalytic combustion is required via initiation system components 114. One possible means is the addition of a manually activated valve within the fueling transfer system. In this way the operator can open a valve which allows the flow of fuel from the fuel container to the catalytic heater assembly.

When a spring is used as the fuel motivator 112 it can either be compressed at the time of use or pre compressed with the spring held in compression for release at the time of use to initiate the device. As an example a pin can be inserted into a hole in a spring retainer which holds the spring. When the pin is removed the spring then pressurizes the fuel.

The initiation system components 114 can each be activated individually in individual steps, etc. One or more of the initiation system components 114 can be attached to the container in such a way as to allow the motion of the container opening to activate the device.

It may also be desirous to enclose the catalyst, or an assembly including the catalyst, in an airtight container to prevent contamination of the catalyst.

In one embodiment the container is comprised mostly of corrugated cardboard. It is probably best manufactured in three main parts, the bottom, the top and the false bottom.

In order for the oxidation of the methanol to occur a flowing fresh supply of oxygen, obtained from the air, must be maintained. In order to insure this supply is sufficient to supply enough oxygen, sufficient channels, or voids, must be maintained between the various components. However, this means that in a normally designed container for this application the container would have large volumes of air in the container. This is not efficient for shipping.

As the air in the device is heated, the chimney effect causes the hot air to rise and exit the upper exhaust openings. As this occurs fresh air is drawn in through the lower intake openings to take its place. By positioning air intake openings as low as possible, and air exhaust openings as high as possible the chimney effect can be maximized.

One design would involve the various components of the container able to slide one within another in a telescopic manner. This way the box is stored and shipped in a small form with the ability to expand the box before use to allow room for air flow.

When ready for use the container will have one or more voids in the bottom, possibly created by a false bottom in the container, with one or more openings on the sides to allow for air intake. The false bottom includes one or more openings in the top of the false bottom to allow the air from the void(s) in the bottom to come up to the catalytic heater assembly which would be located above the false bottom.

The air passes between the one or more catalytic heating assemblies and the food tray. The air then flows up between the food tray and the container's vertical walls.

After the air flows vertically it can either exit through exhaust vents near this point either on the sides or the top or it can be channeled across the top of the food tray between the food tray and the top of the box to exit through one or more exhaust vents on the center of the lid. In this way the warm exhaust air can pass more heat into the food as it travels past.

The above embodiments are to illustrate, not limit the invention. Other embodiments are also envisioned including use of other fuels; the lid, bottom, and false bottom potentially being made of other materials like plastic, wood, metal, etc.; the fuel cartridge being made of other fuel compatible materials such as metal, etc.; the fuel pressurized by other means, such as gravity, by the fuel cartridge being held higher than the system to develop pressure, or the fuel cartridge being flexible and placed beneath some or all of the unit allowing the mass of the unit to pressurize the fuel. Many other embodiments are envisioned.

In one embodiment of the system, the catalytic burner is supported on a false bottom. Air enters through one or more air inlet(s) in the side below the false bottom on which the burner is supported. Fuel flow is controlled through a fuel transfer system including on or more capillary tube(s) to one or more semipermeable or porous semipermeable membrane(s) which allow fuel vapor to pass through to the catalyst. Flameless combustion occurs at the catalyst, producing radiant and conductive heat and hot gases pass heat to the food tray via convective contact.

The false bottom is a shelf like part which supports the burner(s) and creates a void beneath the false bottom to allow for incoming air flow to enter from under the burner(s) which has several advantages, including increasing the vertical distance between the air inlet and the exhaust vent, thus increasing the chimney effect, as well as allowing more oxygen rich air to come in contact with more catalyst, thus improving the combustion.

An optional layer of dry water 36, a dry powder container water droplets surrounded by silica, placed on top of the heat diffuser releases water on heating, to create steam and enhance heat transfer.

Two or more substantially vertical side surfaces form an enclosure. Less than four sides are needed if at least one is curved. Two similar sides could form a single elliptical or circular sleeve which would accommodate a squashed envelope and make clear the vent situation.

The food tray could be, for example, similar to those used in unified group military rations (e.g. UGR-E™), a covered food grade plastic tray with food sealed inside. Multiple food trays can be packed in one oven, or multiple ovens can be placed in one box to provide a multi course meal to a field group such as soldiers. The food trays to be heated are each housed in a disposable telescopic self-contained individual heating oven.

One embodiment of the oven is of the form of a corrugated box enclosing one or more food trays to be heated. In an example, the disposable telescopic self-contained heating oven is telescoped inward, occupying a height of about 3 inches, thus saving space for shipping. The food tray is about 2½ inches thick. The oven has distinct corrugated parts which, when expanded by telescoping outward, increase the height of the oven to produce spaces between the components to allow for air flow; a bottom, a false bottom spaced about ¾ inch above the bottom, a food tray support spaced about ¾ inch above the one or more burner(s) resting on the false bottom, and a lid spaced about ¾ inch above the top of the food tray, all surrounded by vertical walls.

The vertical walls of the lid and bottom of the corrugated box oven are configured to hold the separations of the parts and to hold the food tray. The food tray and the oven box can be rectangular in shape. Two opposite support sides of the box are closely positioned to two opposite sides of the food tray. The non-support sides of the oven box are spaced outward from other sides of the food tray to allow for vertical air flow around these sides.

The support sides of the oven box supporting the food tray have reinforced wall designs and tabs that bend inward to hold the food tray above the burner on the false bottom. Similar tabs on telescoping walls of the bottom and the false bottom hold the false bottom above the bottom. In one embodiment, the bottom and the false bottom are formed or assembled in a rigid connection.

The cover is held separated from the top of the food tray by similar inward bent tabs. A lid is integrally hinged on the cover to inspect, remove or replace the tray.

The end walls of the bottom have one or more air inlet(s) to admit air. A hole near the center of the false bottom allows the air to flow upward. The air flows outward from the center hole and contacts the fuel vapor at the burners that are supported on the false bottom. Flameless combustion occurs on surfaces of the catalyst producing heat.

The false bottom may be left out and the oven appears more as a traditional box. One or more air inlet(s) located near the bottom of the oven allows air flow in and across between the food tray and the burner(s), at the opposite end of the food tray the air flow is forced upward, where it could exit via an exhaust vent at this end of the food tray or the air flow may then be forced across the top of the food tray between the food tray and the lid.

A heat diffuser is located above the burners and is held between the bottom of the food tray and the burners to diffuse the radiant heat from the burners over the entire food tray bottom. The heat diffuser is in thermal contact with the bottom of the food tray to transfer heat and so as not to interfere with the air flow across top of burner(s). The hot exhaust gases of the fuel and air combustion pass between the burners and the bottom of the food tray, then around the ends of the food tray and over the top of the food tray and out of one or more exhaust vent(s) on the top of the lid or near the top of the vertical walls of the lid. Thus the tray is heated by radiant heat, convection and conduction aided by contact of heat diffuser (in proximity to food tray) with convective flow of hot gases. The heat diffuser can be made of numerous materials, for example aluminum or zinc. The heat diffuser can be manufactured in numerous ways, for example cast, stamped, die cut or simply sheared. It may be desired to darken the color of the heat diffuser on one or both sides to aid in its ability to absorb radiant heat for its diffusion, as well as optimize its heat conduction and/or radiation to the food tray.

The fuel cartridge is designed to contain a fuel within the oven. An activating pin is removed releasing a pre compressed spring to pressurize the fuel cartridge which is connected to one or more capillary tube(s) that lead to the burners. Fuel vapor diffuses through the molecularly permeable or porous semipermeable membrane and contacts the catalyst in the presence of air, producing flameless combustion.

The fuel may flow by capillary action or may be forced through the flow-limiting capillary tube or orifice by a spring forced diaphragm in or on the fuel cartridge. The spring may be released by removing the activating pin.

The fuel supply lasts for any length of time required to produce sufficient continuous heat to heat the contents of the food trays to desired temperatures for consumption.

The heaters are described in copending U.S. patent application Ser. No. 12/729,702, filed Mar. 23, 2010 and Ser. No. 13/026,848, filed Feb. 14, 2011, which respectively have priority of U.S. provisional applications 61/162,503, filed Mar. 23, 2009 and 61/304,704, filed Feb. 15, 2010, the disclosures of which are incorporated herein in their entirety as if fully set forth herein.

These and further and other objects and features of the invention are apparent in the disclosure, which includes the above and ongoing written specification, with the claims and the drawings.

DETAILED DESCRIPTION OF THE DRAWINGS

Figure 1:
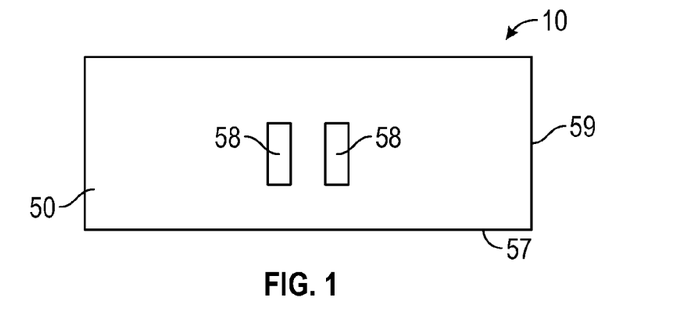
FIG. 1 is a top view of the oven box containing a sealed food tray and a heater.

FIG. 1 is a top view of the oven box 10 containing a sealed food tray and a heater and having a hinged lid for inspecting, removing and replacing the heat tray.

Figure 2:
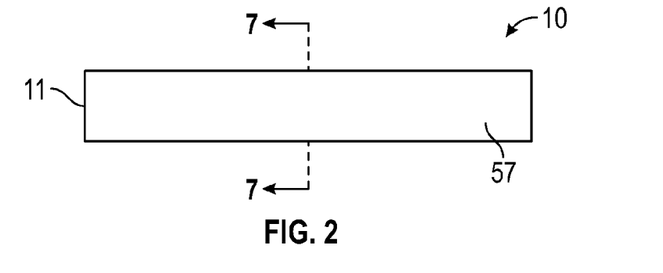
FIG. 2 is a longitudinal side view of the tray-containing heater box as it is shipped and received in telescoped form.

FIG. 2 is a longitudinal side view of the tray-containing heater box 10 as it is shipped and received in telescoped form 11.

Figure 3:
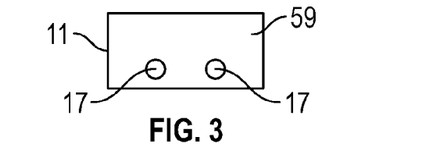
FIG. 3 is an end view of the tray-containing heater box as it is shipped and received in telescoped form.

FIG. 3 is an end view of the tray-containing heater box 10 as it is shipped and received in telescoped form 11.

Figure 4:
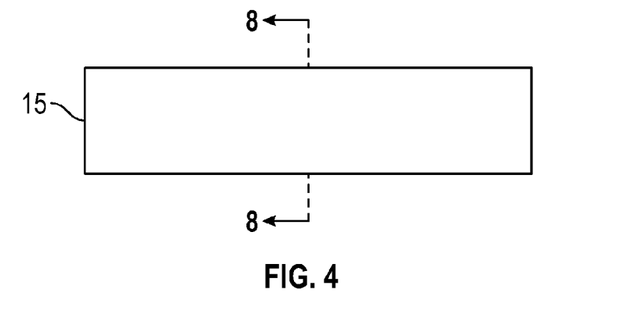
FIG. 4 is an end view of the heater box after it is expanded for use.

FIG. 4 is a side view of the heater box 10 after it is expanded 15 for use.

Figure 5:
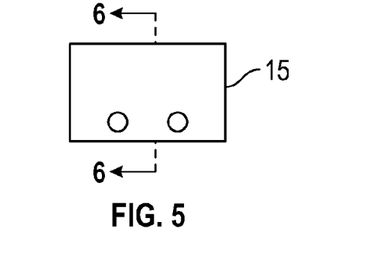
FIG. 5 is an end view of the food tray-containing heater box after it is expanded and in use.

FIG. 5 is an end view of the food tray-containing heater box 10 after it is expanded 15 for use.

Figure 6:
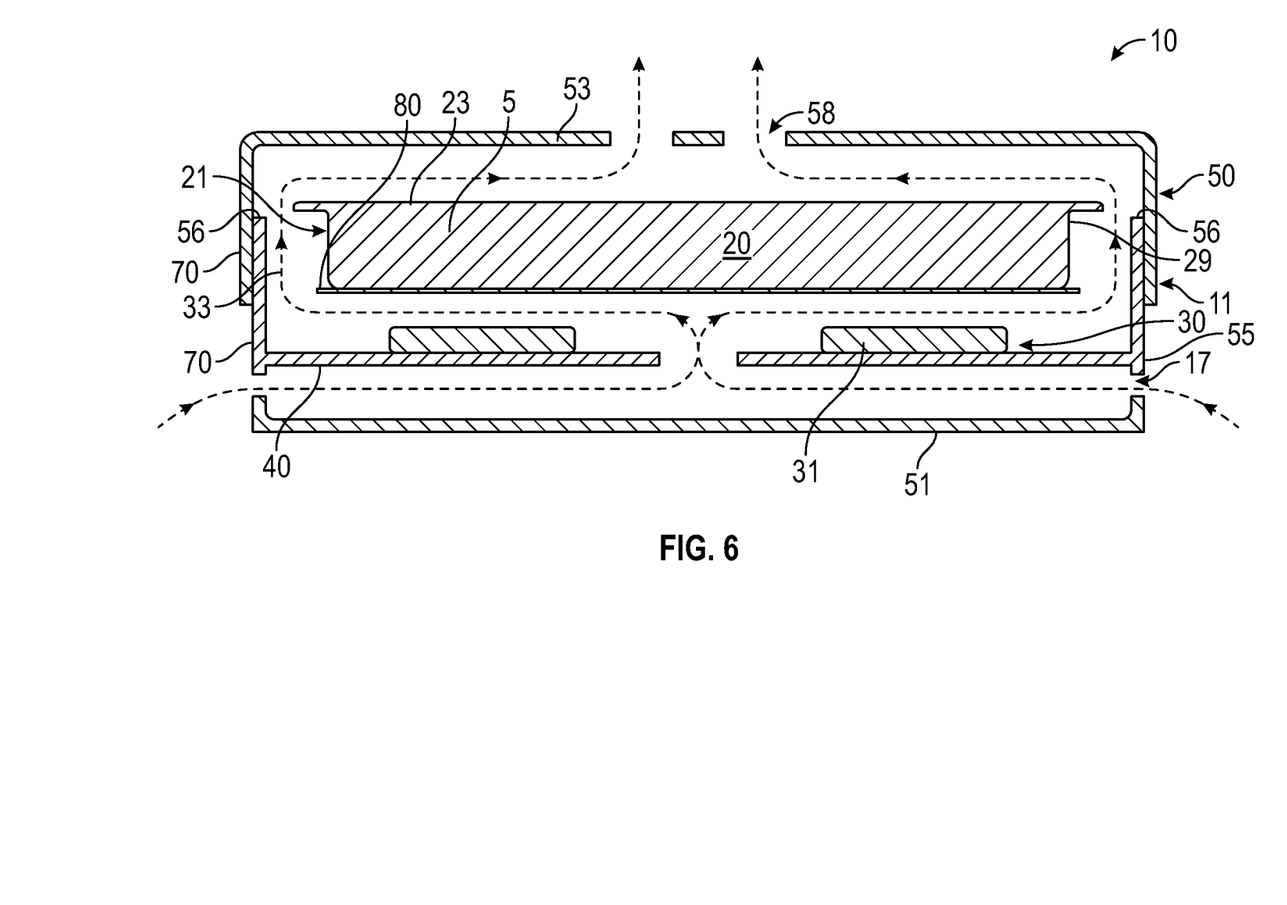
FIG. 6 is a vertical cross-section schematic view of the food tray-containing heater box taken along line 6-6 in FIG. 5.

FIG. 6 is a vertical cross-section schematic view of the food tray-containing heater oven 10 in expanded form 15 taken along line 6-6 in FIG. 5.

Food in a food tray 20 is supported above a catalyst 31 of a burner 30 (support not shown in cross-section). The food tray 20 may be supported by a support frame 147 or by tabs 61 or the support frame could be a heat diffuser 80 serving to support the food tray 20. Fuel vapor and air produce flameless heat at the catalyst 31. Radiant heat is diffused by heat diffuser 35 from direct contact with the food tray 20. Hot exhaust gases 33 flow below the food tray 20 and heat diffuser 35, around the food tray sides 21 and over the top 23 of the food tray 20, heating the food tray 20 and its contents before the hot gases 33 exhaust through a central opening. In one embodiment of the system, burners 30 are supported on a shelf or false bottom 40. Air enters through air inlets 17 below the false bottom 40 on which the burners 30 are supported. Fuel flow is controlled through a capillary tube to a semipermeable membrane which allows fuel vapor to pass through to the catalyst 31. Flameless combustion occurs when fuel vapor and oxygen in the air reacts at the catalyst surfaces, producing radiant conductive and convective heat and hot gases which carry heat to the food tray.

The food tray 20 could be, for example, similar to those used in unified group military rations (e.g. UGR-E™), a covered food grade plastic tray with food sealed inside. Multiple food trays can be packed in one oven 10, or multiple ovens can be placed in one box to provide a multi course meal to a field group such as soldiers. The food trays 20 to be heated are each housed in a disposable telescopic self-contained individual heating oven 10.

The heating oven 10 is in the form of a corrugated box 50 enclosing one or more food trays 20 to be heated. In an example, the disposable telescoped self-contained heating oven 10 is telescoped inward 11, occupying a height of about 3 inches. The food tray is about 2½ inches in height. As highlighted in FIG. 13, oven has distinct corrugated parts which, when expanded by telescoping outward, provide a bottom 51, a false bottom 40 spaced about ¾ inch above the bottom 51, a food tray support frame 149 for spacing, the bottom of the food tray 20 about ¾ inch above the burners 31 on the false bottom 40, and a lid 53 spaced about ¾ inch above the top of the food tray 20.

The walls 55 of the lid 53 and bottom 51 of the corrugated box 50 are configured to hold the separations of the parts and to hold the food tray 20. The food tray 20 and the oven 10 are rectangular. Elongated sides 57 of the box 50 are spaced outward from elongated sides 27 of the food tray 20. Shorter ends 59 of the oven 10 are closely positioned to shorter ends 29 of the food tray 20.

Figure 8:
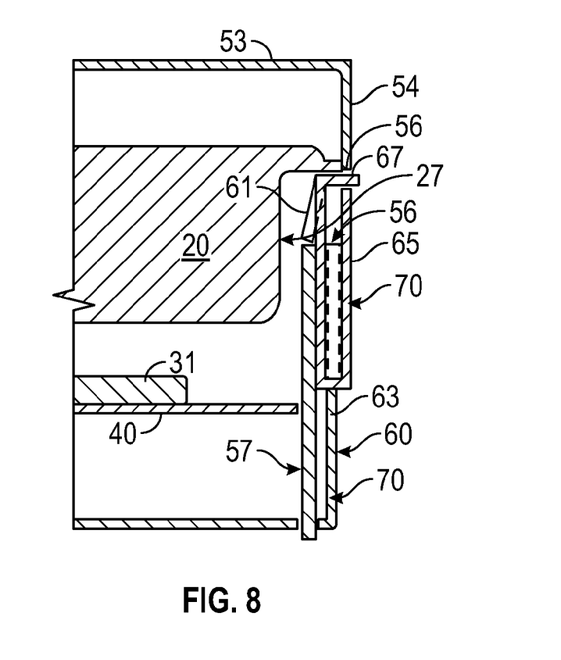
FIG. 8 is a cross-sectional quarter view detail of an expanded tray-containing heater box taken along line 8-8 in FIG. 4.

As shown in FIG. 8, the elongated sides 57 of the oven 10 have reinforced walls 60 and tabs 61 that bend inward to engage outward extended rims or edges of the top of the food tray 20 and top edges of the bottom 51 to hold the food tray 20 spaced above the burners 30 on the false bottom 40. Similar tabs on telescoping walls of the bottom 51 and the false bottom 40 hold the false bottom 40 above the bottom 51. In one embodiment, the bottom 51 and the false bottom 40 are formed in a rigid connection which does not move with the telescoping motion.

The lid 53 is held separated from the top of the food tray 20 by similar inward bent tabs 61 or by friction between the telescoping walls 70.

The end walls 71 of the bottom 51 have air inlets 17 to admit air. A hole 47 near the center of the false bottom 40 allows the air to flow inward between the bottom 51 and the false bottom 40, then flows upward through the center hole 47 in the false bottom 40. The air flows outward over the burners 30 and meets the fuel vapor at the catalyst 31. Flameless combustion occurs on surfaces of the catalyst 31, producing heat.

A heat diffuser 80 is located above the burners 30 and is held between the bottom of the food tray 20 and the burners 30 to diffuse the radiant heat from the burners 30 over the entire food tray 20 bottom. The heat diffuser 80 is in thermal contact with the bottom of the food tray 20 to transfer heat and so as not to interfere with the air flow across top of burners 30. The hot exhaust gases 33 of the fuel and air combustion pass between the burners 30 and the bottom of the food tray 20, then around the ends 29 of the food tray and over the top of the food tray and out of one or more exhaust vent(s) 58 on the top of the lid 53 or near the top of the vertical walls of the lid 53. Thus the food tray 20 is heated by radiant heat, convection and conduction aided by contact of heat diffuser 80 (in proximity to food tray) with convective flow of hot gases. The heat diffuser 80 can be made of numerous materials, for example aluminum or zinc. The heat diffuser 80 can be manufactured in numerous ways, for example cast, stamped, die cut or simply sheared. It may be desired to darken the color of the heat diffuser 80 on one or both sides to aid in its ability to absorb radiant heat for its diffusion, as well as optimize its heat conduction and/or radiation to the food tray 20.

Figure 7:
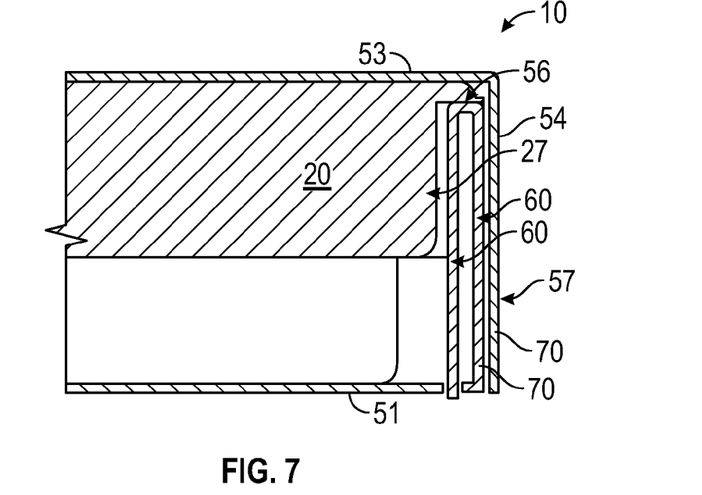
FIG. 7 is a cross-sectional quarter view detail of a telescoped tray-containing heater box taken along line 7-7 in FIG. 2.

FIG. 7 is a cross-sectional quarter view detail of the telescoped heater oven 10 taken along line 7-7 in FIG. 2 and showing the reinforced wall structures 60 of the elongated side walls 57 of the box.

FIG. 8 is a cross-sectional quarter view detail of an expanded oven 10 taken along line 8-8 in FIG. 3. Reinforced wall portions 65, to which the tabs 61 and tray support tops 67 are attached, slide in the recesses 63 to extend the oven 10 and hold it in expanded form 15. The slidable wall portions 63, tabs 61 and support tops 67 are positioned in at least one place along each longitudinal side wall so that the tray is supported.

Figure 9:
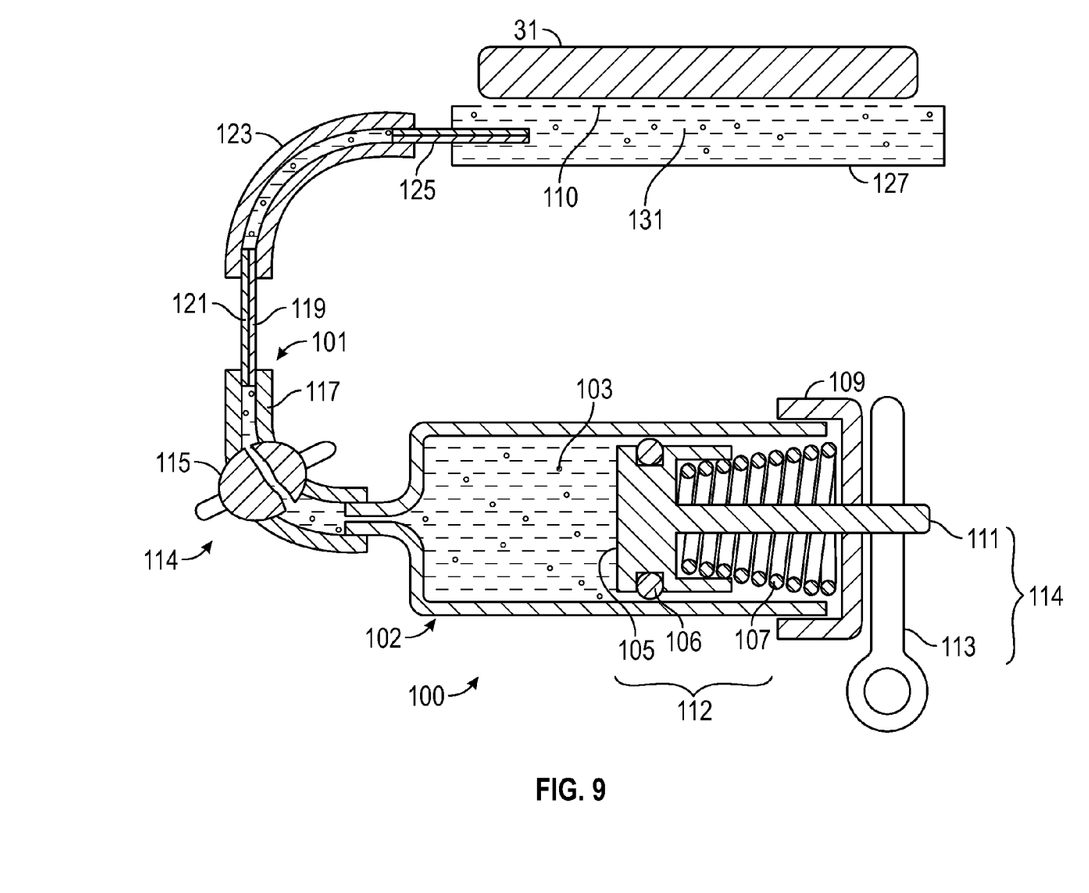
FIG. 9 is a schematic representation of a fuel container with flow-limiting connection to a semipermeable membrane for releasing vapor to a catalyst pad.

FIG. 9 is a schematic representation of a fuel cartridge 100 with a flow-limiting connection 101 to a semipermeable membrane 110 for releasing fuel vapor to a catalyst 31.

The fuel cartridge 100 is designed to contain a fuel 103 within the fuel container 102 within the oven. An activating pin 113 is removed releasing a pre compressed spring 107 to pressurize the fuel cartridge 100 which is connected to one or more capillary tube(s) 119 that lead to the burner 30. Fuel vapor 131 diffuses through the molecularly semipermeable or porous membrane 110 and contacts the catalyst 31 in the presence of air, producing flameless combustion.

The fuel may flow by capillary action or may be forced through the flow-limiting capillary tube 119 or orifice by a spring forced diaphragm or plunger 105 in or on the fuel cartridge 100. The spring 107 may be released by removing the activating pin 113.

Fuel cartridge 100 contains fuel 103 within a fuel container 102 and a plunger 105 having a seal 106 which is urged inward by spring 107 compressed between a cap 109 and the plunger 105.

The spring 107 is held compressed by a piston rod 111 that extends through the cap and by a pin 113 that extends through an opening in the piston rod.

Activating pin 113 is removed from the piston rod 111 to release the spring 107 and pressurize the fuel 103 in the container 100. Valve 115 is opened to allow the fuel to flow through tube 117 to capillary tube 119. Capillary tube 119 has a fine lumen 121 that restricts the flow rate of the fuel 103 from the container. A tube 123 is connected between the capillary tube 119 and a pipe 125 which supplies fuel to a reservoir 127. The reservoir may be a sealed sponge. In the reservoir 127 fuel vapor 131 is released from the liquid fuel 103.

A semipermeable or porous membrane 110 on the reservoir 127 allows the fuel vapor 131 to flow into the catalyst 31 where the fuel vapor 131 and oxygen in the air unite in a flameless exothermic reaction. The heated air and hot gas flow under the heat diffuser 35 and around sides and ends of the food tray and over its top and finally exhaust through vent openings in the lid 53. Food in the tray is heated within a short time.

The oven 10 in expanded form 15 is heated by flameless catalytic burning of hydrogen bearing fuels 103. The oven 10 has a housing having top and bottom surfaces and two or more side and end surfaces. Three or more side surfaces are used, if none is curved to form an enclosure. At least one air intake opening 17 and at least one exhaust gas vent 58 opening enable the convective flow of heated air and exhaust gases 33. A catalytic heater is in contact with air and fuel vapor 131, such that upon activation the heat produced motivates the heated air and exhaust gases 33 to rise causing a convective single pass flow of air by chimney effect. Air enters from the intake opening 17 and hot air and combustion product gases exit through the exhaust gas vent 58.

A food tray 20, the contents of which are to be heated, is suspended over the burner 30 such that air entering through the intake opening 17, located lower than the food tray 20, passes between the food tray 20 and the burner 30. Then heated air and hot combustion gases, having traversed the bottom of the food tray 20, are directed by air gaps between the food tray 20 and a side surfaces of the oven such that heated air and hot combustion gases flow upward motivated by chimney effect, to cross over the top of the food tray 20 before that heated air and hot combustion gases 33 exit the oven's one or more exhaust vents 58.

A thermally conductive sheet or panel is suspended below the food tray 20 such that it does not divert or interrupt the convection of gases, but absorbs radiant heat from the burner, and heat from the heated gases, to make random and, hence, uniform spatial distribution of temperatures experienced by the bottom of the food tray 20, and to re-radiate heat from the conductive sheet to the food tray 20.

The burner 30 has a fuel inlet and distribution system below a molecularly semipermeable membrane 110, through which fuel vapor 131 is capable of diffusion. The semipermeable membrane 110 is positioned below a porous layer comprised of or coated or impregnated with catalyst(s) 31 such that fuel vapor 131 and air approaching it from opposite sides meet at the catalyst layer.

The semipermeable membrane 110 is constructed as an envelope to contain the fuel 103, and the fuel 103 boils in the envelope.

The oven surfaces have one or more hinged parts or panels allowing for opening or closing the oven 10 to access internal components and a food tray 20, the contents of which are to be or have been heated by the oven 10. The oven 10 enclosure is akin to a fireplace with a flue. The food tray 20 is a shelf-stable military ration in a sealed polymeric or laminated container or pouch.

In the oven a food tray 20, the contents of which are to be heated, is suspended over multiple burners 30 with one or more slots between burners 30 such that air entering through the one or more intake openings 17, located lower than the burner 30, passes between the burners 30 upwards toward the food tray 20, and is directed by one or more air gaps between the food tray 20 and one or more side surfaces of the oven 10 such that heated and hot exhaust gases 33 flow upward, motivated by chimney effect, around the food tray 20 and out of a central exhaust vent 58 in the top surface of the oven 10.

Figure 10:
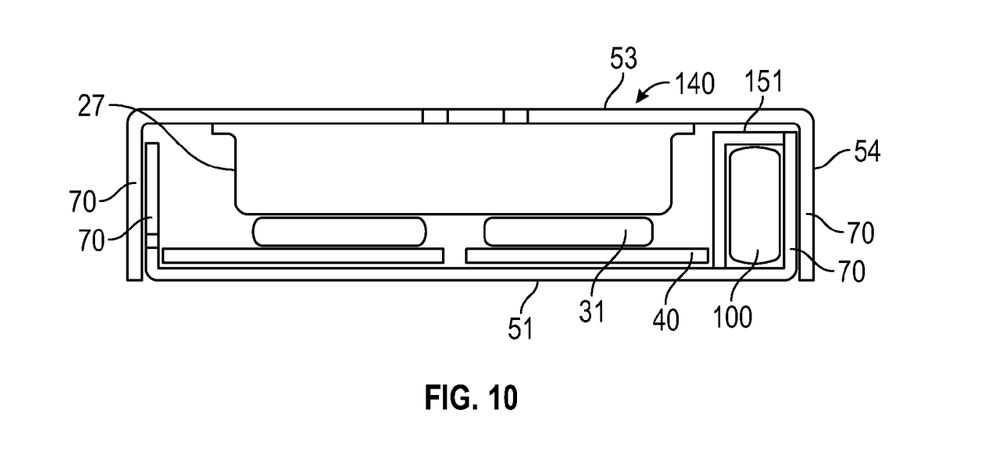
FIG. 10 shows a cross sectional side elevation of an alternate embodiment.
Figure 12:
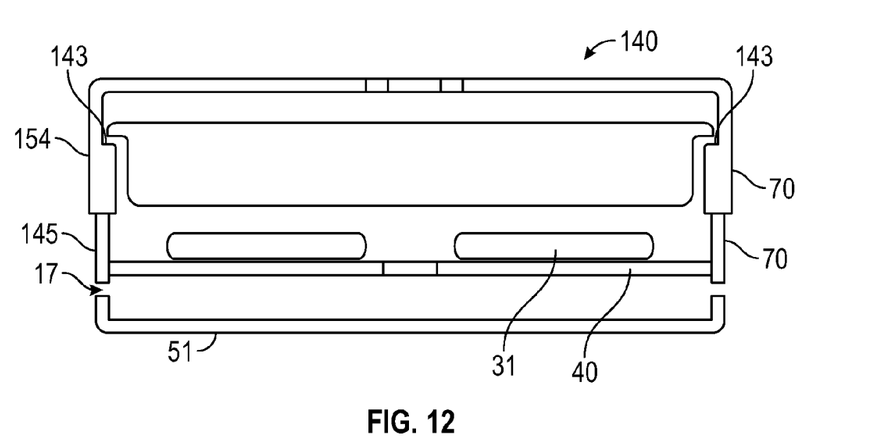
FIG. 12 shows how tabs 143 on the lower reinforced walls 145 of the box may be extended outward.

FIG. 10 shows a cross sectional side elevation of an alternate embodiment 140 in telescoped condition 11 in which the fuel container 102 is held within an internal compartment 151 in the oven 10 and connections such as shown in FIG. 9 are used. When the oven 10 is expanded to the ready condition 15 as shown in FIG. 12, the valve and/or pin are exposed to provide access. The walls 54 of the lid 53 are configured to hold the lid 53 above the top of the food tray 20.

Figure 11:
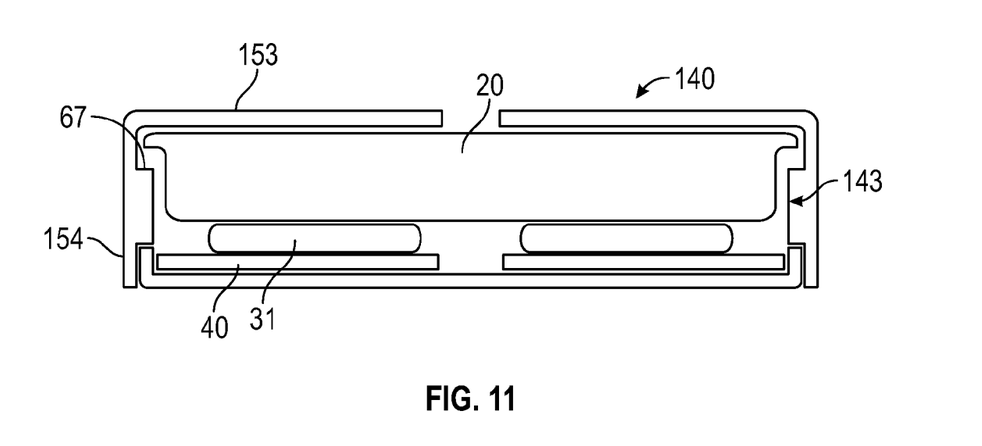
FIG. 11 is an end cross sectional view showing how parts of the intern walls of the cover are inward extended.

FIG. 11 is an end cross sectional view showing how parts of the intern walls of the cover are inward extended 143 such as by bent tabs or internal reinforcements of the type shown in FIGS. 7 and 8 to support the extended rim of the food tray 20.

One inner side of the cover wall shows the inward supporting extensions which like tabs 61 shown in FIG. 8 are spaced along apposite side walls.

FIG. 12 shows how tabs 143 on the lower reinforced walls 145 of the box may be extended outward to support the reinforced cover walls 154 to lift and support the elements of the oven box 15.

Figure 13:
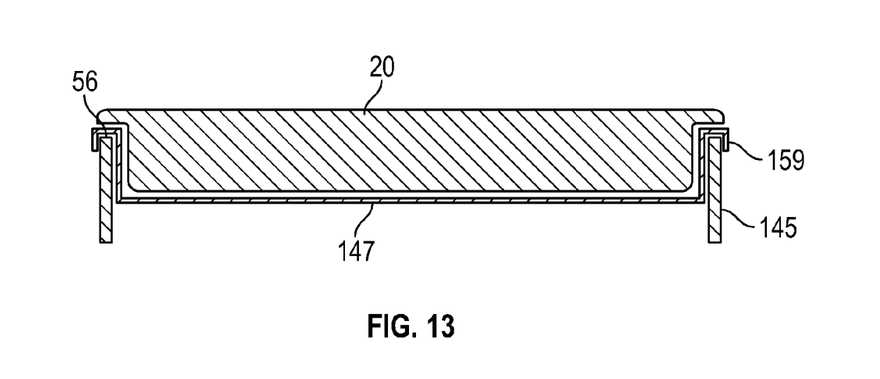
FIG. 13 shows a support frame 147 supported by hooks 159 engaging the lower reinforced walls 145 of the oven box.

FIG. 13 shows a support frame 147 supported by hooks 159 engaging the lower reinforced walls 145 of the oven box.

Figure 14:
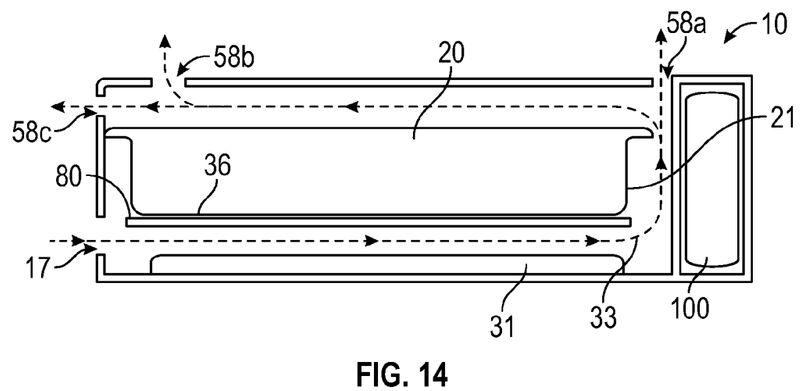
FIG. 14 schematically shows an oven box with an air entrance at one end with air and hot gas flowing across the full length of the shelf and exiting at locations spaced on the lid.

FIG. 14 shows one embodiment in which the air comes in the air inlet 17, flows between the heat diffuser 80 and the burner 31 around the food tray sides 21. The hot exhaust gasses 33 flow up due to chimney effect. The hot exhaust gasses 33 can then escape through exhaust vent 58a, exhaust vent 58b, or exhaust vent 58c, or any combination thereof. There are advantages and disadvantages to each and the specifics of the application will indicate which to use and in what combination. Exhaust vent 58a provides for the greatest air flow since the hot exhaust gasses 33 will travel the shortest distance in the oven 10; however, the hot exhaust gasses 33 will also have the shortest distance and time in contact with the food tray 20, thereby imparting the least amount of heat into the food tray 20. Exhaust vent 58b and exhaust vent 58c provide for the greatest amount of distance and time for the hot exhaust gases 33 to remain in thermal contact with the food tray 20, thereby imparting more heat to the food tray 20; however, the reduced air flow due to the longer distance as well as the increased horizontal travel of the hot exhaust gasses 33 may cause the total air flow to be insufficient to provide ample oxygen for the combustion process. It may be desirable to use a combination. If exhaust vent 58a in placed in the oven 10, but it is not of sufficient area to allow all of the hot exhaust gasses 33 to leave the oven 10 unencumbered, exhaust vent 58b can then be placed in the oven 10 to allow for additional exhausting. In this way some of the hot exhaust gasses 33 travel across the top of the food tray 20 imparting more heat to the food tray 20, while some of the hot exhaust gasses 33 escape through exhaust vent 58a thereby increasing the total volume of air flow entering air inlet 17 increasing the amount of oxygen available for the combustion reaction.

While the invention has been described with reference to specific embodiments, modifications and variations of the invention may be constructed without departing from the scope of the invention, which is defined in the following claims.

We claim:

1. Apparatus comprising a field-ready oven comprising:
    an oven box having a cover having a top surface, cover side walls and at least one support for holding at least one tray of contents and a base having a bottom surface, a false bottom and base side walls, wherein the false bottom is spaced above the base bottom surface and wherein the base bottom surface, base false bottom and base side walls define a false bottom cavity in the base;
    wherein the cover top surface, base false bottom and side walls define an oven cavity in the oven box for containing at least one tray of contents;
    at least one catalytic heater assembly within the oven cavity that is configured for a flameless catalytic chemical reaction and comprised of one or more catalyst pads and a semipermeable or porous membrane for delivery of fuel vapor to the one or more catalyst pads;
    a fuel source in communication with the catalytic heater assembly for allowing fuel to flow to the catalyst pad;
    a fuel motivator connected to the fuel source;
    an initiation system connected to the fuel motivator;
    at least one tray of contents having a top surface, bottom surface and sides;

at least one air entry port in the base side walls near the lower portion of the base for admitting air into the false bottom cavity;

at least one air flow opening in the base false bottom for passage of air from the false bottom cavity into the oven cavity, and at least one exhaust port in the cover for exhausting air and heated gases from the oven box, wherein the base false bottom supports the catalytic heater assembly such that the catalytic heater assembly is capable of heating the tray of contents upon activation;

wherein the cover side walls and base side walls are configured for telescoping and wherein the at least one cover support and telescoping side walls are configured such that, when extended, the top cover extends away from the false bottom and holds the cover and tray of contents spaced apart from the false bottom to provide for an air gap between the catalytic heater assembly and the tray of contents to allow sufficient air to reach the one or more catalyst pads to maintain a flameless catalytic chemical reaction;

wherein the oven box, at least one air entry port, the at least one air flow opening and the at least one exhaust port are configured to define an air passageway to allow inward flowing air from the at least one air entry port to flow into the false bottom cavity, upward through the air flow opening of the false bottom, across the bottom surface of the tray of contents in fluid contact with the fuel at the catalytic heater assembly, then vertically along at least one side of the tray of contents before finally exiting out the at least one exhaust port in the cover wherein the oven box, at least one air entry port, the at least one air flow opening and the at least one exhaust port are configured to enable convective flow of heated air and exhaust gases in thermal contact with the tray of contents whereby upon activation the heat produced motivates heated air and exhaust gases to rise causing a convective single pass flow of air by a chimney effect of air entering from the air inlet opening and exiting through the exhaust vent allowing adequate oxygen rich air to come in contact with the catalytic heater assembly.

2. The apparatus of claim 1, further comprising a heat diffuser in thermal contact with the bottom surface of the tray of contents and situated between the catalytic heater assembly and the tray of contents and configured to diffuse radiant heat from the at least one catalytic heater assembly over the bottom surface of the tray of contents and so as not to interfere with the air flow across top of the at least one catalytic heater assembly.

3. The apparatus of claim 2, wherein the telescoping side walls are configured such that when collapsed the top cover blocks the at least one air entry port in the side walls.

4. The apparatus of claim 3, further comprising a fuel transfer system for controlling fuel delivery to the semipermeable or porous membrane.

5. The apparatus of claim 4, wherein the fuel transfer system comprises one or more fuel lines, the fuel source comprises a fuel cartridge and the initiation system comprises a valve in the fuel line for closing and opening the fuel line.

6. The apparatus of claim 5, wherein the fuel cartridge comprises a fuel container in fluid communication with the fuel motivator.

7. The apparatus of claim 6, wherein the fuel motivator is a pump or spring forced diaphragm or plunger connected to the fuel container.

8. The apparatus of claim 7, wherein the heat diffuser comprises aluminum or zinc.

9. The apparatus of claim 4, wherein the fuel motivator comprises a piston connected to the fuel source, and the initiation system comprises a cap connected to the fuel source, a spring compressed between the cap and the piston, a rod extending from the piston through the cap, and a pin connected to the rod outside of the cap, whereby removing the pin from the rod releases the compressed spring to move fuel through the apparatus.

10. The apparatus of claim 9, further comprising a water source configured to releases water on heating in order to create steam and enhance heat transfer.

11. The apparatus of claim 10, wherein the water source comprises dry water powder positioned above the heat diffuser.

12. The apparatus of claim 1, wherein the side walls are telescoping walls that are inwardly telescoped to form a reduced height of the oven and are outwardly telescoped to erect the oven ready for use.

13. A field-ready oven according to claim 1, wherein the defined air passageway is configured such that heated air and hot combustion gases are motivated by chimney effect to flow across over at least a portion of the top of the tray of contents while in thermal contact with the tray of contents before the heated air and hot combustion gases exit the oven's one or more exhaust vents.

14. The apparatus of claim 13, further comprising one or more additional exhaust vents in the cover configured such that at least some of the heated air and hot combustion gases travels across in thermal contact with the top of the tray of contents while at least some of the heated air and hot combustion gases escapes through the one or more additional exhaust vents thereby increasing the total volume of air flow entering the at least one air entry port and increasing the amount of oxygen available for the combustion reaction.

15. The apparatus of claim 6, wherein the heated air and hot gas flow across the top of the container before the heated air and hot gas exit the at least one exhaust vent opening.

16. The apparatus of claim 15, wherein the at least one exhaust vent opening further comprises plural exhaust vent openings spaced along and at ends of the top surface allowing the heated air and hot gas to escape with little restriction and increasing overall flow of incoming air and the heated air and hot gas.

17. The apparatus of claim 16, further comprising a thermally conductive sheet or panel below the container such that thermally conductive sheet does not divert or interrupt the convection of the heated air and hot gas, wherein the thermally conductive sheet absorbs radiant heat from the heater, and heat from the heated gases, to make random and uniform spatial distribution of temperatures experienced by a bottom of the container, and to re-radiate heat to the container.

18. The oven of claim 17, in which the heater comprises a fuel inlet and distribution system below a molecularly semipermeable or porous membrane, through which the fuel is diffused, which semipermeable or porous membrane is below a porous layer comprised of, coated or impregnated with catalysts such that fuel and air meet at the catalyst layer and produce heat and hot gas.

19. The apparatus of claim 18, further comprising fuel stored within the oven.

* * * * *